United States Patent [19]

Petranovich

[11] Patent Number: 5,444,696
[45] Date of Patent: Aug. 22, 1995

[54] FRAME STRUCTURE USING CONSECUTIVE SLOT ASSIGNMENTS FOR MOBILE COMMUNICATIONS

[75] Inventor: James E. Petranovich, Encinitas, Calif.

[73] Assignee: Pacific Communication Sciences, Inc., San Diego, Calif.

[21] Appl. No.: 145,745

[22] Filed: Oct. 29, 1993

[51] Int. Cl.$^6$ .................. H04J 4/00; H04Q 7/36
[52] U.S. Cl. .................. 370/17; 370/29; 370/50; 370/95.3
[58] Field of Search .............. 370/17, 29, 30, 32, 370/50, 95.1, 95.3, 13, 24, 27, 31, 69.1; 375/14; 379/60, 63; 455/33.1, 33.2, 33.3, 54.1, 54.2, 56.1, 57.1

[56] References Cited

U.S. PATENT DOCUMENTS

| | | | |
|---|---|---|---|
| 5,229,995 | 7/1993 | Strawczynski et al. | 370/95.1 X |
| 5,278,835 | 1/1994 | Ito et al. | 370/95.3 |
| 5,309,429 | 5/1994 | Fukuda | 370/29 |
| 5,361,395 | 11/1994 | Yamamoto | 370/95.3 X |

*Primary Examiner*—Melvin Marcelo
*Attorney, Agent, or Firm*—Woodcock Washburn Kurtz Mackiewicz & Norris

[57] ABSTRACT

An improved frame structure for use in mobile communications systems utilizing slotted protocols is provided. According to the present invention, consecutive slots in a frame are assigned to each mobile unit so that the mobile unit transmits to a base station during the first slot and receives a transmission from the base station during the second slot. This frame structure, permits the mobile unit to monitor various frequencies for a longer and more continuous period of time. It is important for the mobile unit to have enough time to monitor frequencies while it is not transmitting or receiving so that base station handoff and interference avoidance handoff techniques can be performed by the mobile communications system. Furthermore, according to the frame structure provided by the present invention, the mobile units can be designed with a standard frequency synthesizer. The improved frame structure also allows channel distortion to be minimized by providing adaptive equalization with transmit precompensation and/or antenna diversity in the base stations.

20 Claims, 4 Drawing Sheets

FRAME STRUCTURE USING CONSECUTIVE SLOT ASSIGNMENTS FOR MOBILE COMMUNICATIONS

FIELD OF THE INVENTION

The present invention relates to an improved frame structure for use in mobile communication systems. More particularly the present invention relates to an improved slot assignment in mobile communication systems using time division duplexing or time division multiple access techniques.

BACKGROUND

In recent years time division duplexing (TDD) has often been used in digital wireless communications systems. TDD is primarily used for transferring data, voice, and control information between two units. These units which are shown in FIG. 1 may be designated as base stations 101 or mobile units 100. Each base station 101 is generally a stationary unit while a mobile unit 100 is usually portable, hand held, mounted in a vehicle, etc. There are usually more mobile units 100 as shown in FIG. 1 than base stations 101. Therefore, minimizing cost, weight, and power consumption, is more important in the mobile units 100 than in the base stations 101.

TDD systems are defined as systems where the available frequency bandwidth is divided into frequency channels and each frequency channel is divided into time slots. One example of a TDD system is the Japanese digital cordless telephone (J-DCT), (also called personal handy phone—PHP) specified by the Japanese MOPT document RCR-28. In this system, frequency is divided into approximately sixteen, 300 kHz, frequency channels and each frequency channel is divided into eight time slots which together define a frame.

FIG. 2 shows the frame structure of the J-DCT system. The first four time slots 104 are reserved for transmissions from the mobile units and the next four time slots 106 are reserved for transmissions from one base station. Usually each transmit slot is rigidly paired with a receive slot so that each mobile unit is assigned one time slot during which it transmits to the base station and one time slot in which it receives transmissions from the base station during each frame. For instance, returning to FIG. 1, mobile units 100 designated as M1, M2, M3 and M4 are each assigned one of the time slots 104 in which the assigned mobile unit transmits to one of the base stations 101 such as the base station identified as BS1. Therefore, if the slots are numbered 1 to 8 in time as shown in FIG. 2, a mobile unit will transmit on a time slot from 1 to 4 and the base station will transmit back during a time slot exactly four slot times later. Accordingly, if a mobile unit transmits in time slot 2, the base station will transmit back to that mobile unit in time slot 6.

In TDD systems, each mobile unit typical transmits and receives on the same frequency. However, it is not unusual for a mobile unit in a TDD system to use transmit and receive frequencies which differ only by some fixed offset. By using a fixed offset frequency between the mobile unit's transmit and receive frequencies, the mobile unit's frequency synthesizer does not have to change frequencies between transmission and reception. It should be understood that the frequency offset can be applied to the receive signal prior to downconversion or to the transmit signal after upconversion to avoid modifying the synthesizer frequency, which may be both complicated and time-consuming.

TDMA (time division multiple access) differs from TDD in that the transmit and receive frequencies are often paired but different. U.S. digital cellular (IS-19B) is a TDMA system with six time slots per frequency channel. However, the receive and transmit frequency used in TDMA are often selected so that the offset technique described above can be used.

A fundamental advantage of using the same frequency during transmission and reception is that many channel distortions will be substantially symmetric. So equipment in the base station can be used to detect and compensate for channel distortions in its receiver and then pre-compensate for the distortions prior to transmission.

Fading caused by multipath is one factor which results in channel distortion. Another common factor resulting in channel distortion in mobile systems is frequency selective fading (also called time dispersion). This phenomenon results when there are two or more signal paths between the transmitter and receiver of comparable signal levels when at least one of the paths is significantly longer the another. If the maximum path difference is long enough the signal propagation delays may cause information to be missed or lost. Specifically, the receiver error rate is increased with signal propagation delay and that error cannot be reduced.

One way to reduce the effects of channel distortion is to use some form of antenna diversity. The base stations in the J-DCT system, for example, typically include spatial diversity by using two receive antennas. An example of the use of spatial diversity in such a system is disclosed in application Ser. No. 08/129,562 filed on Sep. 30, 1993. In general, antenna diversity systems recover data from the signal received on the better of the two antennas on a slot by slot basis. The base station transmits on the same antenna it last received on. This allows the mobile unit to be implemented without its own antenna diversity.

The advantages of TDD begin to be lost in more mobile systems. One problem is that if a mobile unit moves a significant percentage of a wavelength (in the J-DCT system a wavelength is approximately 15.8 cm) between its transmit slot time (when the base station receives) and its receive time slot (when the base station transmits) then the symmetry mentioned above no longer applies. Therefore, the greater number of time slots between a mobile unit's transmit and receive slots, the less the symmetry channel has with respect to distortion due to fading.

Typically reliable communications with diversity at the base station only, require that the maximum path difference between the transmit and receive paths change no more than 10%–20% of the wavelength at the operating frequency. In the J-DCT system, for instance, a slot time is approximately 625 μsec. Therefore, the mobile unit cannot exceed a speed of about 14.2 miles per hour (10% of 15.8 cm is 1.58 cm, the mobile unit cannot travel more than 1.58 cm in 2.5 ms—the time between transmit and receive slots in the J-DCT system).

Another disadvantage of using TDD or TDMA in mobile communications systems is that the frame structures in such systems cannot be efficiently used for several reasons. In mobile systems such as the J-DCT system, a plurality of base stations are provided so that as a mobile unit moves away from one stationary base station towards a different stationary base station the communications link can be handed off from one base station to another. For instance, referring back to FIG. 1, if M3 is moving away from BS1 toward BS2, at some point it would become necessary for the communications link between BS1 and M3 to be handed off to BS2 so that M3 can still transmit and receive. There are many known techniques for performing this type of handoff. One technique is commonly referred to as a Mobile Assisted Handoff (MAHO).

Most base station handoff techniques assign one time slot in a frame to be used by the base station to transmit a base station ID on a control frequency. The base station transmits its ID in the assigned slot at some predetermined interval (e.g., every Nth frame where N is an integer). The mobile units monitor transmissions at the control frequency and make a determination related to the quality of any signal received at that frequency, e.g., signal strength indication. For example, if BS1 and M3 have established a communication link and it is determined that the signal received by M3 while monitoring the control frequency was transmitted from BS2 and that that signal's quality is better than the signal quality of signals received from BS1, then M3 would request a handoff from BS1 to BS2.

Monitoring other operating frequencies is also desirable in mobile communication systems so that each mobile unit/base station link can be optimized by transmitting and receiving on preferable operating frequencies. As described above in connection with the J-DCT system, 16 frequency channels are allocated with each frequency channel subdivided into four additional channels. Although, theoretically, each base station could communicate with 64 mobile units (16 frequency channels with four slot pairs each), typically the number is far less in actual operation. Thus, a number of channels may be open at any given time. For this reason, mobile units also monitor the other possible operating frequencies during time slots when the mobile unit is not transmitting to or receiving signals from the base station. If it is determined that a different operating frequency would provide better communications with the base station, the base station attempts to reassign the mobile unit's operating frequency using techniques which are generically referred to as Interference Avoidance Handoff. Such techniques are well known and widely used.

The slotted protocol described above has several performance disadvantages with respect to base station hand off and interference avoidance handoff. To accommodate such techniques in a TDD system the frequency synthesizer in each mobile unit would need to be capable of switching frequencies rather quickly to monitor the required frequencies. However, that capability would add a significant cost and undesirable complexity to the mobile units themselves. Therefore, most mobile units use a standard frequency synthesizer, such as those commercially available from Signetics, Motorola and other manufacturers.

For instance, in the J-DCT system, the frequency synthesizer used in the mobile units generally requires one time slot to switch frequencies. Referring back to FIG. 1, if M3 transmits to BS1 in time slot 2 and BS2 transmits to M3 in time slot 6, M3 would use time slots 1 and 3 to switch frequencies for transmission, and time slots 5 and 7 to switch frequencies for reception. Only time slots 3 and 8 would be available to monitor the control frequency and/or other frequency channels for a potential base station handoff or channel reassignment.

With only two non-contiguous time slots, it would be virtually impossible to efficiently monitor other operating frequencies to determine whether a mobile unit would be benefitted by a channel reassignment. Similarly, monitoring the control frequencies of other base stations to determine whether to handoff a mobile unit from one base station to another would also be ineffective where the monitoring time is broken up and short in duration. When the time bases associated with different base stations are not one base station may transmit its ID in the middle of another base station's time slot. In that case a mobile unit synchronized with one base station may not be able to receive and decode a different base station's transmission within the available time slots.

Therefore, there is a need to provide a mobile communications system which can effectively reduce channel degradation caused by fading and can efficiently monitor both other frequency channels and other base station transmissions so that known handoff techniques can be used effectively.

SUMMARY OF THE INVENTION

The present invention fulfills this need by providing an improved frame structure in which each mobile unit is assigned a transmit slot and a consecutive receive slot. The frame structure according to the present invention is provided in mobile communications systems using time division duplexing or time division multiple access. A wireless communications system is also provided by the present invention comprising a peripheral station which transmits to a central station in a first time slot and a central station which receives the transmitted signal in the first slot and transmits a return signal in the next time slot. In a preferred embodiment the wireless communications system is a mobile terrestrial communications system and the central station is a stationary base station and the peripheral station is a mobile unit. In a further preferred embodiment the mobile units comprise a standard frequency synthesizer. In another preferred embodiment, the base station provides either adaptive equalization with transmit precompensation or antenna diversity. In an even more preferable embodiment, the base station comprises both.

The present invention also provides a method for generating additional time slots during which mobile units are capable of monitoring other operating frequencies and the signal quality of transmissions from various base stations. This method comprises the steps of defining a predetermined period of time as a frame, subdividing the frame into a plurality of time slots, transmitting a signal from one of the mobile units to one base station during one of the time slots, and receiving a signal from the base station during the next adjacent time slot.

Another method is provided by the present invention for minimizing channel distortion in a communications system using a slotted protocol. This method comprises the steps of assigning each mobile unit consecutive transmit and receive slots, transmitting a signal from one mobile unit during its transmit slot, receiving that signal at the base station, adaptively equalizing the received signal to define parameters of a receive filter, generating a transmit filter to compensate for channel distortion by using substantially similar parameters of the receive filter to define the transmit filter, and filtering a signal to be transmitted from the base station back to the mobile unit using the transmit filter.

BRIEF DESCRIPTION OF THE DRAWINGS

The present invention will be better understood, and its numerous objects and advantages will become apparent by reference to the following detailed description of the invention when taken in conjunction with the following drawings, in which.

DETAILED DESCRIPTION OF THE INVENTION

Figure 3:
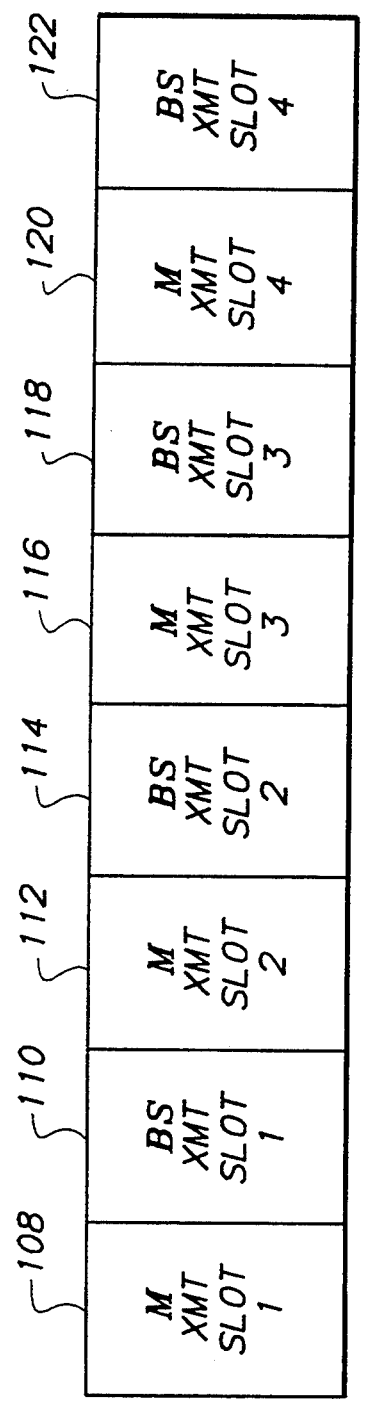
FIG. 3 is an example of a frame structure according to a preferred embodiment of the present invention.

FIG. 3 shows a preferred frame structure to be used in a mobile communicators system according to the present invention. The frame structure shown in FIG. 3 is divided into 8 time slots. Although it should be understood that any even number of time slots may be employed, eight 625 $\mu$sec. time slots per frame are specified herein for exemplary purposes only.

Figure 1:
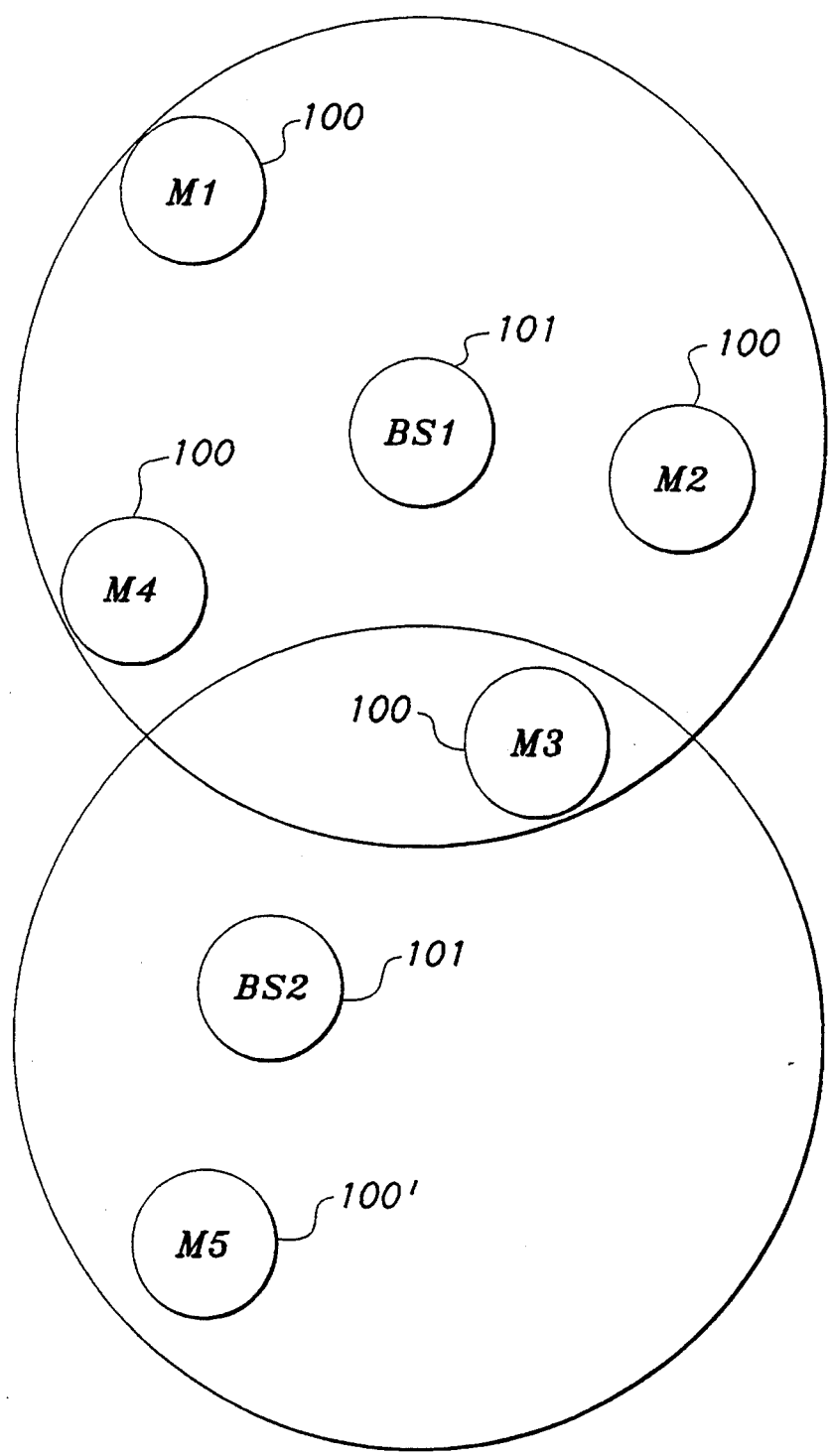
FIG. 1 shows an arrangement of base stations and mobile units of a wireless mobile communications system.
Figure 2:
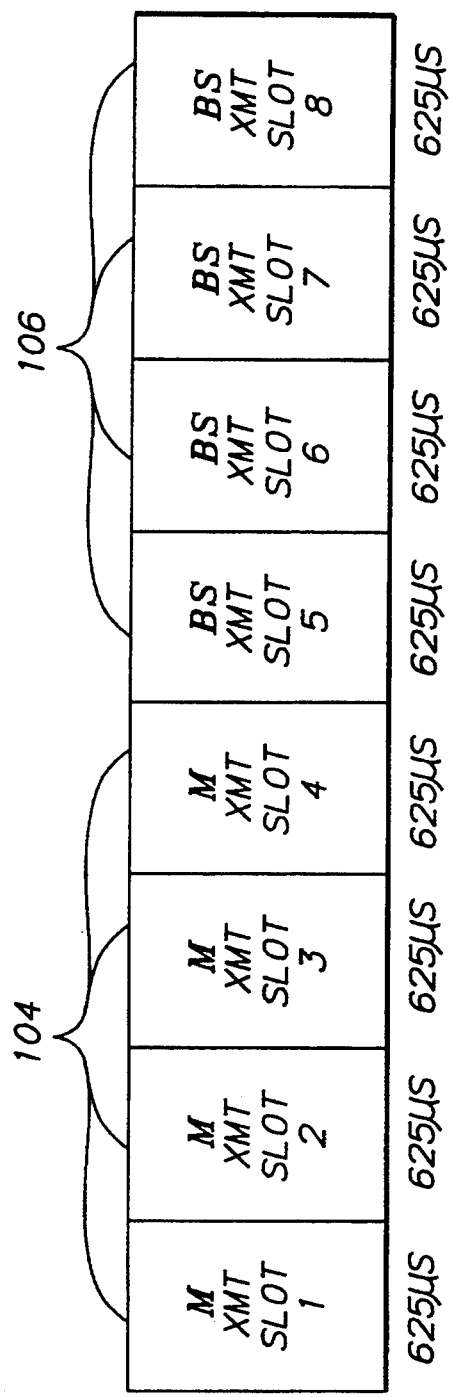
FIG. 2 is an example of a frame structure used by known TDD and TDMA systems.

Each mobile unit is assigned one time slot during which it transmits to the base station (hereinafter "transmit slot") and one time slot in which it receives transmissions from the base station (hereinafter "receive slot"). However, in contrast to previous TDD or TDMA systems, the mobile unit's receive slot follows directly after the mobile unit's transmit slot. For instance, consider, the mobile units 100 shown in FIG. 1, M1, M2, M3, and M4. Transmit slot 108 and receive slot 110 could be assigned to M1. Transmit slot 112 and receive slot 114 could be assigned to M2. Transmit slots 116 and 120 and receive slots 118 and 122 could be assigned to M3 and M4 respectively.

The use of this frame structure in substantially any mobile TDD system or any mobile TDMA system providing a fixed frequency offset between the transmit and receive frequencies permits the mobile units more continuous time to monitor the control frequency or other frequency channels. For instance, if M2 is assigned transmit slot 112 and receive slot 114, slots 118, 120, 122 of the current frame and slot 108 in the next frame will be available for monitoring the other frequencies assuming that the M2 has a frequency synthesizer which requires 1 slot time to change frequencies. Given this scenario, M2 would be adjusting its frequency synthesizer during slot 110, transmitting in its assigned transmit slot 112, receiving in its assigned receive slot 114, and adjusting its frequency synthesizer during slot 116. It should be evident that by pairing the transmit and receive slots as shown in FIG. 3, both base station and interference avoidance handoff techniques can be efficiently handled in TDD and TDMA systems.

By reducing the amount of time between mobile unit transmission and mobile unit reception, the channel characteristics also have less time to change. For example, if the carrier frequency is 1.9 GHz (such as might be used in personal communication systems), the base station is fixed, and the mobile unit is moving at 50 mph, the wavelength is approximately 15.8 cm. The vehicle moves about one tenth of a wavelength approximately every 707 $\mu$sec. It should be understood that the relative path phases will change significantly for every movement of one tenth of a wavelength. In a conventional mobile system such as the J-DCT, with 2.5 milliseconds between mobile unit transmission and reception, the channel characteristics may change greatly in this time to substantially degrade system performance.

Adaptive equalization is one technique which has been used to minimize channel distortion in stationary communications systems or slowly moving systems. However, adaptive equalization with transmit precompensation was not effective in mobile TDD or TDMA systems because the channel characteristics typically would change too much between transmission and reception.

The principle of adaptive equalization is to estimate the channel characteristics at the receiver, determine the effective distortion due to fading, and compensate for the distortion by passing the receive signal through an inverse filter, i.e., inverse amplitude and complementary phase. Since filtering is a linear process, the channel distortion is substantially cancelled if the inverse filter is applied to the transmit signal before the transmitted signal is degraded by the fading. In most, if not all, mobile systems using a slotted protocol adaptive equalization cannot be used since the channel changes significantly between reception and the next transmission to estimate receiver distortion and apply the same or similar characteristics to the transmit signal before actual transmission. While adaptive equalization improves the channel quality between the mobile unit and the base station it only increases the complexity of the base station and not the mobile unit.

Adaptive equalization in the receiver of the base station is a well known technique, and has been used in many mobile communication systems. U.S. Digital cellular (IS-54) is an example of a TDMA system usually requiring adaptive equalization. There are many forms of equalization, including linear, linear feedback, and decision feedback. The type of equalizer refers to the structure of the digital filter used for modeling the channel distortion. However, it should be understood that TDMA system cannot use adaptive equalization with transmit pre-compensation as suggested above since the transmit and receive frequencies in most cases differ. Even traditional TDD systems cannot use adaptive equalization with transmit precompensation techniques since the channel characteristics often differ too much between the transmit and receive paths. However, if the frame structure shown in FIG. 3 is used in a TDD system, adaptive equalization with transmit precompensation may be effectively provided by the base station as described in more detail below.

Figure 4:
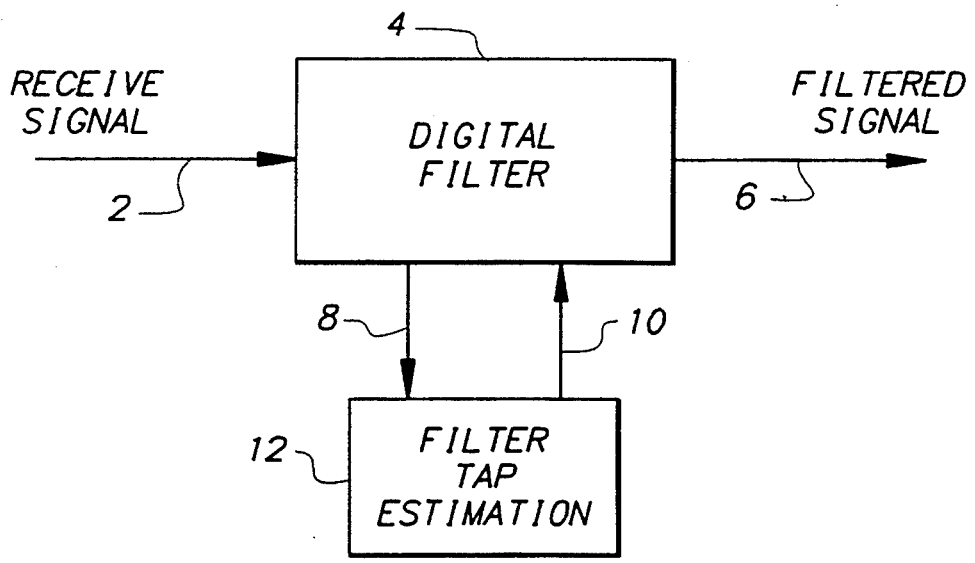
FIG. 4 is a block diagram of a receiver adaptive equalizer.

A block diagram of a typical equalizer is shown in FIG. 4. The input 2 is the received signal, already distorted by the channel impairments such as frequency selective fading. The digital filter 4 substantially removes the signal distortion by applying an inverse filter to the received signal 2. The taps of a digital filter are determined by the filter tap estimator 12 using various filter reference points 8. The tap estimation algorithm and digital filter structure depend on the type of filter and type of estimator selected. A number of well-known techniques can be used to estimate the desired filter parameters. The estimator provides new filter tap coefficients 10 to the digital filter 4. The filtered signal 6 is ideally identical to the transmitted signal before it was degraded by channel distortion.

Figure 5:
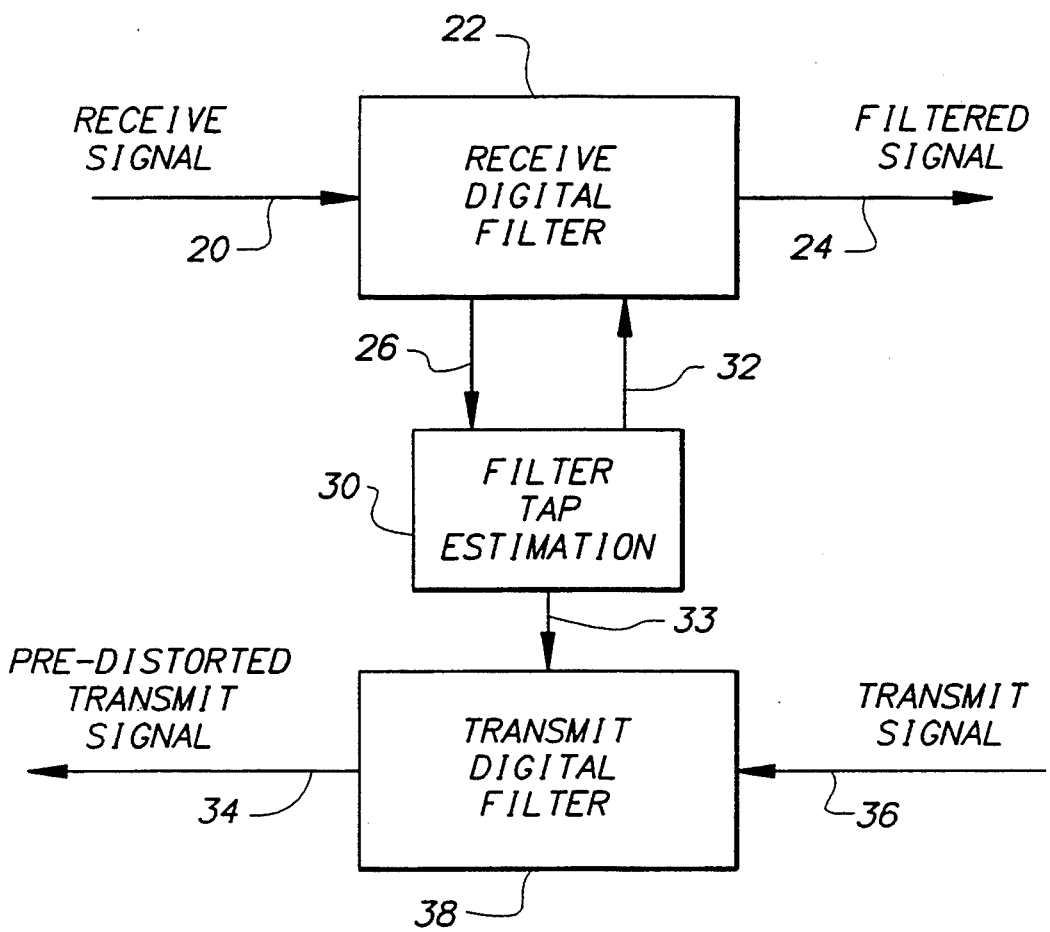
FIG. 5 is a block diagram of an adaptive equalizer with transmit precompensation according to the present invention.

An adaptive equalizer with transmit precompensation is shown in FIG. 5. The receiver processing is substantially identical to that used in the adaptive equalizer shown in FIG. 4. In addition, the filter tap estimator 30 provides tap estimates 33 to a transmit digital filter 38. The tap values 33 are similar to the tap values 32 determined for use by the receive digital filter 22. The transmit filter 38 has a structure similar to that of the receive filter 22. In many implementations it is possible for the transmit and receive filters to be shared by reusing the receive filter (e.g. digital filter 4 shown in FIG. 4) in the transmitter. The ideal transmit signal 36 is pre-distorted by transmit filter 38 to generate the actual transmit signal 34.

An adaptive equalizer with the transmit precompensation capability would commonly be implemented in a digital signal processor, i.e., such as a Texas Instrument's C51 processor. It could also be implemented using custom VLSI hardware or with similar digital technology. If the base station is designed with an appropriate adaptive equalizer with the transmit precompensation as described above, the frame structure shown in FIG. 3 can be used to substantially minimize channel distortion. It should also be understood that using the frame structure shown in FIG. 3 to decrease the time between transmission and reception in a mobile communications system would also improve the effectiveness of a base station that utilizes antenna diversity.

While the invention has been described and illustrated with reference to specific embodiments, those skilled in the art will recognize that modification and variations may be made without departing from the principles of the invention as described herein above and set forth in the following claims.

I claim:

1. A frame structure for use in a multiple frequency wireless communication system having at least one central station and a plurality of peripheral stations in which said stations communicate data using a slotted protocol having a predetermined number of slots in a frame, comprising:
    a transit slot in which said at least one central station transmits to one peripheral station; and
    a receive slot in which said one peripheral station transmits back to said central station, said receive slot being adjacent in time to said transmit slot;
    whereby the number of slots available for monitoring various frequencies exceeds two slots.

2. The frame structure of claim 1, wherein the wireless communications system is a mobile terrestrial communications system in which said at least one central station is a stationary base station and said plurality of peripheral stations are mobile units.

3. The frame structure of claim 1, wherein the slotted protocol is a time division duplexing protocol.

4. The frame structure of claim 1, wherein the slotted protocol is a time division multiple access protocol.

5. The frame structure of claim 1, wherein each of said peripheral stations use a single frequency synthesizer to upconvert for transmission and downconvert for reception.

6. The frame structure of claim 1, wherein a plurality of transmit slots and receive slots are provided such that one transmit slot is paired with one adjacent receive slot, whereby each peripheral station is assigned to one pair of slots.

7. The frame structure of claim 1, wherein a number of transmit slots are provided during a predetermined time interval defining a frame and an equal number of receive slots are assigned so that each transmit slot is followed by one receive slot to form consecutive pairs of one transmit slot and one receive slot, each peripheral station being assigned to one said pair of slots for communicating with said central station during each frame.

8. A multiple frequency wireless communications system using a frame structure providing a predetermined number of time slots in each frame, comprising:
    a first peripheral station for transmitting a signal comprising data during a first time slot in a first frame;
    a central station for receiving said signal during said first time slot; and
    said central station being configured to transmit a return signal comprising data to said first peripheral station in a second time slot in said first frame adjacent to said first time slot;
    whereby said first peripheral station monitors various frequencies during at least two consecutive time slots between said second time slot in said first frame and said first time slot in the next frame.

9. The system of claim 8, further comprising:
    at least one other peripheral station, each peripheral station transmitting a respective signal comprising data to said central station during a respective time slot in said first frame;
    said central station receiving said respective signals during each of the respective time slots, said central station being configured to transmit a respective return signal comprising data to each said peripheral station during a next time slot directly following the respective time slot in which each respective signal is so received.

10. The system of claim 8, wherein the wireless communications system is a mobile terrestrial communications system.

11. The system of claim 8, wherein the central station is a stationary base station and said first peripheral station is a mobile unit.

12. The system of claim 11, wherein said base station provides adaptive equalization with transmit precompensation to substantially minimize channel distortion.

13. The system of claim 9, wherein said central station is a stationary base station and said peripheral stations are mobile units, said wireless communications system being operable when any said mobile unit travels at a speed exceeding fifty miles per hour.

14. In a mobile communications system comprising at least one base station and a plurality of mobile units, said mobile units communicating with one base station using a slotted protocol, each mobile unit transmitting at an assigned operating frequency, a method for generating additional time slots for use by at least one mobile unit to monitor frequencies other than the assigned frequency of that mobile unit, comprising the steps of:
    defining a predetermined period of time as a frame;
    subdividing said frame into a plurality of time slots;
    transmitting a first signal from said one mobile unit to said one base station during one of said time slots; and
    receiving a second signal at said one mobile unit during a next time slot directly following said one time slot, said second signal being transmitted by said one base station.

15. The method of claim 14, further comprising the step of:
transmitting an identification signal from another base station at a predetermined control frequency, said identification signal having information for identifying said other base station; and
monitoring said control frequency during a time period of at least two consecutive time slots.

16. The method of claim 15, further comprising the steps of:
detecting at least one identification signal during said time period in which said control frequency is being monitored to identify a new base station;
determining based on a characteristic of said at least one identification signal so detected whether a communications link between said one mobile unit and said one base station should be handed off to establish a new communications link between said one mobile unit and said new base station.

17. The method of claim 14, wherein a number of said plurality of mobile units are assigned different operating frequencies, the method further comprising the step of:
monitoring said different operating frequencies over a time period of at least two consecutive time slots.

18. The method of claim 17, further comprising the step of:
evaluating based upon said different operating frequencies so monitored whether the assigned operating frequency of said one mobile unit should be reassigned to one of said different operating frequencies.

19. A method of minimizing channel distortion in a mobile communications system having at least one stationary base station and a plurality of mobile units, said mobile communications system using time division duplexing so that each mobile unit is assigned a time slot in which said mobile unit is operable to transmit to said base station, said time slot defining a transmit slot and each said mobile unit is assigned a second time slot in which said mobile unit is operable to receive a transmission from said base station said second time slot defining a receive slot, the method comprising the steps of:
assigning each mobile unit consecutive transmit and receive slots;
transmitting a first signal from one mobile unit during a respective transmit slot of said one mobile unit;
receiving said first signal at said base station during said respective transmit slot;
adaptively equalizing said signal so received to define parameters of a receive filter:
generating a transmit filter to compensate for channel distortion by using substantially similar parameters of said receive filter to define said transmit filter; and
filtering a second signal to be transmitted from said base station back to said one mobile unit using said transmit filter so generated.

20. The method of claim 19, wherein said stationary base station provides spatial antenna diversity.

* * * * *